(12) United States Patent
Imaoku et al.

(10) Patent No.: US 8,736,960 B2
(45) Date of Patent: May 27, 2014

(54) STRUCTURE WITH OBSERVATION PORT

(75) Inventors: Takao Imaoku, Osaka (JP); Tokio Taguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 31 days.

(21) Appl. No.: 13/388,544

(22) PCT Filed: Apr. 30, 2010

(86) PCT No.: PCT/JP2010/057701
§ 371 (c)(1),
(2), (4) Date: Feb. 2, 2012

(87) PCT Pub. No.: WO2011/033818
PCT Pub. Date: Mar. 24, 2011

(65) Prior Publication Data
US 2012/0134023 A1 May 31, 2012

(30) Foreign Application Priority Data

Sep. 15, 2009 (JP) .................................. 2009-213299

(51) Int. Cl.
*G02B 5/28* (2006.01)
(52) U.S. Cl.
USPC ......................................................... 359/589
(58) Field of Classification Search
USPC ........... 359/589, 599, 581; 349/112; 362/620, 362/626
See application file for complete search history.

(56) References Cited

U.S. PATENT DOCUMENTS 7,336,421 B2 * 2/2008 Tanaka ........................ 359/581
2008/0218866 A1 9/2008 Kawata et al.
2010/0171908 A1 * 7/2010 Yoshihara ........................ 349/96
2012/0170126 A1 7/2012 Imaoku et al.

FOREIGN PATENT DOCUMENTS

| JP | 2002-323860 A | 11/2002 |
|---|---|---|
| JP | 2002-333502 | 11/2002 |
| JP | 2003-215303 A | 7/2003 |
| JP | 2003222701 A | 8/2003 |
| JP | 2004205990 A | 7/2004 |
| JP | 200562674 A | 3/2005 |
| JP | 2007-090656 A | 4/2007 |
| JP | 2008-216733 A | 9/2008 |
| JP | 2008-256728 A | 10/2008 |

OTHER PUBLICATIONS

International Search Report.

* cited by examiner

*Primary Examiner* — James Greece
*Assistant Examiner* — Jie Lei
(74) *Attorney, Agent, or Firm* — Harness, Dickey & Pierce, P.L.C.

(57) ABSTRACT

Provided is a structure with an observation port. The structure with the observation port is provided with the observation port and an internal structure. The internal structure is located to the backside of the observation port and has a third reflection preventing film. The first reflection preventing film is a film that reduces reflected light by using light interference. Each of the second and third reflection preventing films has a surface comprising a plurality of convex portions, a distance between apexes of each adjacent two of which does not exceed the visible light wavelengths. Light obtained by combining light reflected by the surface of the first reflection preventing film, light reflected by the surface of the second reflection preventing film, and light reflected by the surface of the third reflection preventing film has a flat wavelength dispersion within the visible light range.

7 Claims, 12 Drawing Sheets

STRUCTURE WITH OBSERVATION PORT

TECHNICAL FIELD

The present invention relates to a structure with an observation port. The present invention specifically relates to a structure with an observation port suitably used for electronic displays for outdoor uses, such as mobile devices and digital signage.

BACKGROUND ART

Electronic displays mainly used outdoors, such as mobile devices and digital signage, are provided with a protecting plate for the purpose of protecting the surface of a display.

The surface of such a protecting plate, however, is apt to reflect light, and thus to cause a problem that the display is difficult to view. Therefore, the surface of the protecting plate preferably has a function of preventing image reflection, as well as various functions such as functions of preventing damages and of preventing fouling.

Specific examples of a technique for imparting these functions disclosed include attachment of a protecting plate or an optical filter having functions such as an anti-reflection property, anti-glare property, hardcoating property, antistatic property, anti-fouling property, gas-barrier property, and UV (ultraviolet rays) shielding property, on the display surface (see Patent Document 1, for example). Patent Document 1 discloses an optical filter comprising a near infrared radiation reflective layer including a transparent high-refractive-index thin-film layer and a metal thin-film layer for the purpose of shielding near infrared rays and electromagnetic waves radiated from the screens of displays such as plasma display panels, and an optical filter further comprising a commercially available anti-reflection film stacked thereon and thereby being imparted with anti-reflection and anti-glare properties.

Examples of a common anti-reflection film include AR (anti-reflection) films and LR (low reflection) films which form, on the surface of a substrate, a film having a refractive index different from that of the substrate and reduce reflection owing to the interference effect between light reflected from the substrate surface and light reflected from the surface of the applied film. Further, examples of a common anti-glare film include AG (anti-glare) films which form a film having a fine uneven pattern on the substrate surface, and thus prevent reflection of images owing to the light scattering effect.

Such a light-interference anti-reflection film, however, has a reflectance with a high absolute value and strong wavelength dependence, and thus reflection of the surroundings and coloring due to reflected light occur. Therefore, the film can be further improved in these respects.

In contrast, a moth-eye structure is being focused on as a technique for improving visibility at bright sites different from the above films. The moth-eye structure can provide an ultra-anti-reflection effect without light interference. The moth-eye structure is a structure that a fine uneven pattern, which is finer than the uneven pattern formed on an AG film, is arranged at a pitch of not greater than the visible light wavelength (for example, 400 nm or lower) without any gap on the surface of an article to be anti-reflection-treated, and thereby the refractive index at the boundary between the outside (air) and the article surface is made to pseudo-continuously change. Thereby, most part of light is transmitted regardless of the refractive index interface, and light reflection from the article surface can be almost perfectly prevented (see Patent Document 2, for example).

Patent Document 1: JP 2002-323860 A
Patent Document 2: JP 2004-205990 A

The following will describe one example wherein an anti-reflection film is attached on a protecting plate of a display. FIG. 24 and FIG. 25 each are a schematic cross-sectional view showing one example of a display in which an anti-reflection film is disposed on a protecting plate. FIG. 24 shows the case that an AR film or an LR film is used, whereas FIG. 25 shows the case that a film having a moth-eye structure on its surface (hereinafter, also referred to as a moth-eye film) is used.

As shown in FIG. 24 and FIG. 25, a display generally comprises a display panel 101 for image display and a protecting plate 102 for protecting the display panel 101 with an air layer 103 sandwiched therebetween. Since an observer views an image on the display panel 101 through the protecting plate 102, the protecting plate 102 also serves as an observation port. The protecting plate 102 comprises a substrate 102a and an AR film or LR film 102b, or a moth-eye film 102c, disposed on the substrate 102a. Such a structure reduces reflection of light on the surface of the protecting plate 102, and thus good display can be achieved.

The AR film or LR film 102b shown in FIG. 24 has high surface durability, but the absolute value of its reflectance is high and the light reflected therefrom is to have wavelength dependence. Thus, coloring is observed when the protecting plate 102 is viewed. Further, LR films are designed to primarily reduce the reflectance observed from the front direction. Thus, LR films have particularly high viewing-angle dependence and cause regular reflection of most part of light from oblique directions.

In contrast, the moth-eye film 102c shown in FIG. 25 has extremely low reflectance because most part of light passes through the surface of the protecting plate 102. In addition, the film has very low viewing-angle dependence. Thus, coloring due to reflected light is less observed. The moth-eye film 102c, however, has an uneven structure on its surface, and thus it does not have sufficient surface durability.

FIG. 26 is a graph wherein the reflection spectra of an AR film, LR film, and moth-eye film are compared.

The present invention is devised in consideration of the above current situation, and aims to provide a structure with an observation port which can simultaneously achieve low reflection and suppression of coloring due to reflected light.

DISCLOSURE OF THE INVENTION

The present inventors have first performed various studies on means for further achieving low reflectivity. In the studies, they have focused on the fact that light is reflected not only from the outside surface but also from the backside surface of the protecting plate (observation port) and the light affects the display quality, and they have attempted to dispose an anti-reflection film also on the backside surface of the observation port.

Thereby, the present inventors have arrived at the fact that the anti-reflection film attached on the outside surface of the observation port is preferably an anti-reflection film which can achieve better surface durability and which utilizes light interference, such as an AR film or LR film, whereas the anti-reflection film attached on the backside surface is preferably a moth-eye film because the film on this surface does not need surface durability that the film on the outside surface needs to have.

In addition, the present inventors have found that part of the wavelength components of the light incident on the moth-eye film is reflected due to the size of each protruding portion of the moth-eye film. In contrast, they also have found that, utilizing such a wavelength dispersion characteristic, the wavelength dispersion characteristic of the reflected light as a whole can be made flat (even) by designing a structure so as to satisfy the conditions such that the wavelength dispersion characteristic of the light reflected from the surface of the anti-reflection film attached on the outside surface of the observation port, the wavelength dispersion characteristic of the light reflected from the surface of the anti-reflection film attached on the backside surface of the observation port, and the wavelength dispersion characteristic of the light reflected from the surface of the anti-reflection film attached on the internal structure observed through the observation port counteract each other based on the aforementioned wavelength dispersion characteristic of the reflected light. Thereby, the present inventors have found that occurrence of coloring of reflected light can be suppressed, as well as an excellent anti-reflection property and surface durability can be achieved, have arrived at the solution of the above problems, and have completed the present invention.

In other words, the present invention relates to a structure with an observation port, comprising: an observation port comprising a substrate, a first anti-reflection film disposed on an outside surface of the substrate, and a second anti-reflection film disposed on a backside surface of the substrate; and an internal structure placed on a backside of the observation port and comprising a third anti-reflection film, wherein the first anti-reflection film is a film that reduces reflected light owing to light interference, the second anti-reflection film and the third anti-reflection film each have a surface formed by multiple protruding portions, a width between apexes of adjacent protruding portions is not greater than a visible light wavelength, and light obtainable by combining light reflected from a surface of the first anti-reflection film, light reflected from a surface of the second anti-reflection film, and light reflected from a surface of the third anti-reflection film has flat wavelength dispersion within a visible light range. The structure with an observation port of the present invention will be mentioned below in detail.

The structure with an observation port of the present invention comprises an observation port that comprises a substrate, a first anti-reflection film disposed on the outside surface of the substrate, and a second anti-reflection film disposed on the backside surface of the substrate. Since the observation port comprises the substrate with anti-reflection films disposed on the respective surfaces thereof, good visibility with less influence of reflected light can be achieved when an observer visually confirms the internal structure through the observation port. The observation port has translucency in order to allow an observer to visually confirm the internal structure.

The structure with an observation port of the present invention, comprises an internal structure which is placed on the backside of the observation port and which is provided with a third anti-reflection film. The internal structure is not particularly limited as long as it is a structure visually confirmed by an observer through an observation port. In order to easily dispose the third anti-reflection film, the internal structure preferably has a flat surface on the outside.

The first anti-reflection film is a film which reduces reflected light owing to light interference. The first anti-reflection film is disposed on the outside surface of the substrate, and thus is likely to receive contact and impact from the outside. Therefore, it preferably has surface durability. An anti-reflection film with a flat surface, such as an AR film or LR film, is preferable rather than a moth-eye film.

The second anti-reflection film and the third anti-reflection film each have a surface formed by multiple protruding portions. The width between apexes of adjacent protruding portions is not greater than the visible light wavelength. The expression "not greater than the visible light wavelength" herein specifically means 380 nm or shorter. In other words, the second anti-reflection film and the third anti-reflection film are moth-eye films. Thus, a drastic change in the refractive index at the interface between the substrate and the region contacting the substrate can be solved, and most part of the light incident on the substrate passes through the substrate, so that an excellent reflection-preventing effect can be achieved.

Light obtainable by combining the light reflected from the surface of the first anti-reflection film, the light reflected from the surface of the second anti-reflection film, and the light reflected from the surface of the third anti-reflection film has flat wavelength dispersion within the visible light range. The expression "visible light range" herein means a wavelength range of 380 to 780 nm. In the structure with an observation port of the present invention, the wavelength dispersion characteristic of the light reflected from the surface of the first anti-reflection film, the wavelength dispersion characteristic of the light reflected from the surface of the second anti-reflection film, and the wavelength dispersion characteristic of the light reflected from the surface of the third anti-reflection film are made to counteract each other, so that the reflected light in total has even (flat) wavelength dispersion. As a result, coloring generated by reflected light due to the configuration of the structure with an observation port can be suppressed, and an observer can enjoy good visibility.

The expression "have flat wavelength dispersion within the visible light range" herein means that any reflectance value within the visible light range is within the range of ±1.0% from the reflectance at a wavelength of 550 nm. Preferably, any reflectance value within the visible light range is within the range of ±0.2%, more preferably ±0.1%, from the reflectance at a wavelength of 550 nm. Thereby, the effect of suppressing coloring is extremely improved.

In the structure with an observation port of the present invention, the problem that coloring occurs due to reflected light in the case of reducing reflected light caused by the configuration of the structure with an observation port and of combining preferable configurations for the purpose of achieving good surface durability is solved by utilizing the wavelength dispersion characteristic of each anti-reflection film disposed on the structure with an observation port.

The configuration of the structure with an observation port of the present invention is not especially limited by other components as long as it essentially includes these components.

Preferable modes of the structure with an observation port of the present invention are mentioned in more detail below.

An air layer is preferably formed between the observation port and the internal structure. In order to reduce the number of interfaces between the refractive indexes, the structure may have a configuration that the observation port and the internal structure are closely adhered and no air layer is formed between the observation port and the internal structure, that is, the structure may have an airgap-less configuration. In such a case, however, removal of a resin layer disposed between the observation port and the internal structure for adhesion may be difficult upon rework of the structure, for example. In contrast, formation of an air layer makes it easy to rework the structure, as in the present configuration. Further, since the second anti-reflection film (moth-eye film) is disposed on the backside surface of the observation port, formation of an air layer does not cause a problem that the refractive index interface occurs.

The third anti-reflection film is preferably disposed on the outermost surface at the side of the observation port of the internal structure. In the case of disposing a moth-eye film on the outermost surface at the side of the observation port of the internal structure, a problem that the refractive index interface occurs is not caused even though an air layer is formed between the observation port and the internal structure, for example.

Preferably, the internal structure further comprises n–3 nth anti-reflection films (n represents an integer of 4 or greater), and each of the n–3 nth anti-reflection films has a surface formed by multiple protruding portions, with the width between apexes of adjacent protruding portions being not greater than the visible light wavelength. The light obtainable by combining the light reflected from the surface of the first anti-reflection film, the light reflected from the surface of the second anti-reflection film, the light reflected from the surface of the third anti-reflection film, and the light reflected from the surface of each of the n–3 nth anti-reflection films preferably has flat wavelength dispersion within the visible light range. The nth anti-reflection film means a fourth or subsequent moth-eye film. If two other moth-eye films are disposed in addition to the first to third anti-reflection films, for example, these films are named a fourth anti-reflection film and a fifth anti-reflection film. If a fourth or subsequent moth-eye film is disposed in the internal structure at each boundary where the refractive index interface occurs, a further effect of reducing the reflectance can be achieved and the display quality is improved. Further, adjustment of the wavelength dispersion characteristics of the respective anti-reflection films becomes easier as the number of anti-reflection films increases. Thus, the design and placement can be more flexible.

Effects of the Invention

The structure with an observation port of the present invention can exert low reflection and good surface durability, as well as suppress coloring due to reflected light. Thus, high-quality visibility can be achieved with little reflection and coloring due to reflection.

BRIEF DESCRIPTION OF THE DRAWINGS

FIG. 1 is a schematic cross-sectional view of a structure with an observation port of Embodiment 1.
FIG. 2 is a schematic view showing the principle that a light-interference film such as an LR film or AR film achieves low reflection.
FIG. 3 is an enlarged schematic cross-sectional view of the surface of the moth-eye film of the structure with an observation port of Embodiment 1.
FIG. 4 is an enlarged perspective view showing the surface of the moth-eye film of the structure with an observation port of Embodiment 1, wherein the unit structure of each protruding portion is a conical shape.
FIG. 5 is an enlarged perspective view showing the surface of the moth-eye film of the structure with an observation port of Embodiment 1, wherein the unit structure of each protruding portion is a quadrangular pyramid shape.
FIG. 6 is an enlarged perspective view showing the surface of the moth-eye film of the structure with an observation port of Embodiment 1, wherein the slope of the unit structure of each protruding portion becomes mild from the bottom point to the apex and the tip is pointed.
FIG. 7 is an enlarged perspective view showing the surface of the moth-eye film of the structure with an observation port of Embodiment 1, wherein the slope of the unit structure of each protruding portion becomes mild from the bottom point to the apex and the tip is rounded.
FIG. 8 is an enlarged perspective view showing the surface of the moth-eye film of the structure with an observation port of Embodiment 1, wherein the slope of the unit structure of each protruding portion becomes steep from the bottom point to the apex and the tip is rounded.
FIG. 9 is an enlarged perspective view showing the surface of the moth-eye film of the structure with an observation port of Embodiment 1, wherein the slope of the unit structure of each protruding portion becomes steep from the bottom point to the apex and the tip is pointed.
FIG. 10 is, an enlarged perspective view showing the surface of the moth-eye film of the structure with an observation port of Embodiment 1, wherein the heights of adjacent bottom points of protruding portions are different from each other, and a col and a col point exist between adjacent protruding portions.
FIG. 11 is an enlarged perspective view showing the surface of the moth-eye film of the structure with an observation port of Embodiment 1, wherein multiple contact points between adjacent protruding portions exist, and a col and a col point exist between adjacent protruding portions.
FIG. 12 is an enlarged perspective view showing the surface of the moth-eye film of the structure with an observation port of Embodiment 1, wherein multiple contact points between adjacent protruding portions exist, and a col and a col point exist between adjacent protruding portions.
FIG. 13 is an enlarged perspective view showing the surface of the moth-eye film of the structure with an observation port of Embodiment 1, wherein each protruding portion has a dome shape and the film has a col and a col point.
FIG. 14 is an enlarged perspective view showing the surface of the moth-eye film of the structure with an observation port of Embodiment 1, wherein each protruding portion has a needle shape and the film has a col and a col point.
FIG. 15 is a schematic plan view showing the protruding portions of the moth-eye film of the structure with an observation port of Embodiment 1.
FIG. 16 is a schematic view showing a cross section along the A-A' line in FIG. 15 and a cross section along the B-B' line in FIG. 15.
FIG. 17 is a schematic view showing the principle that a moth-eye film achieves low reflection, and showing the cross-sectional structure of the moth-eye film.

FIG. 18 is a schematic view showing the principle that a moth-eye film achieves low reflection, and showing a change in the refractive index (effective refractive index) of the light incident on the moth-eye film.

FIG. 19 is a schematic cross-sectional view of a structure with an observation port of Comparative Example 1.

FIG. 20 is a schematic cross-sectional view of a structure with an observation port of Comparative Example 2.

FIG. 21 is a graph showing the reflection spectra of light reflected from one face of a tabular member formed by disposing a moth-eye film on one face of a black acryl plate (substrate), wherein the height of each protruding portion in one condition is different from that in another condition.

FIG. 22 is a schematic view showing the state of measurement of light reflected due to the configuration of the structures with an observation port of Example 1 and Comparative Example 1.

FIG. 23 is a graph showing the reflection spectra of the light in total in Example 1, Comparative Example 1, and Comparative Example 2, wherein each spectrum is of the light in total reflected due to the configuration of the structure with an observation port.

FIG. 24 is a schematic cross-sectional view showing one example of a display in which an anti-reflection film is disposed on a protecting plate, wherein an AR film or LR film is used.

FIG. 25 is a schematic cross-sectional view showing one example of a display in which an anti-reflection film is disposed on a protecting plate, wherein a moth-eye film is used.

FIG. 26 is a graph wherein the reflection spectra of an AR film, LR film, and moth-eye film are compared.

MODES FOR CARRYING OUT THE INVENTION

Figure 1:
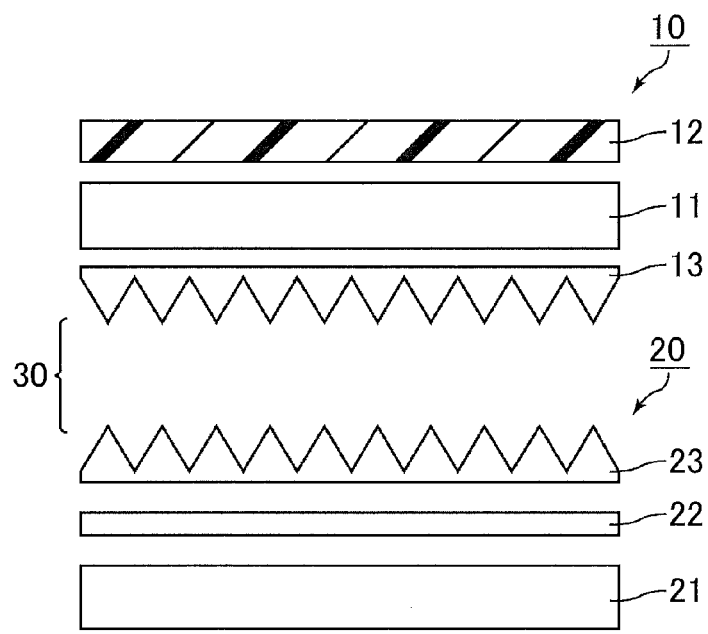
[FIG. 1]

The present invention will be mentioned in more detail referring to the drawings in the following embodiments, but is not limited to these embodiments.

Embodiment 1

Embodiment 1 is one example of the structure with an observation port of the present invention. The structure with an observation port of Embodiment 1 is not particularly limited as long as it is a structure whose inside is observable from the outside, such as display media including liquid crystal displays, organic electroluminescence displays, plasma displays, and cathode-ray tube displays, advertising media including shop windows, appreciation media including aquarium, and show cases.

FIG. 1 is a schematic cross-sectional view of the structure with an observation port of Embodiment 1. As shown in FIG. 1, the structure with an observation port of Embodiment 1 comprises a display panel (internal structure) 20 and a front plate (observation port) 10 disposed on the outside of the display panel 20. The front plate 10 and the display panel 20 are separated by a certain distance and an air layer 30 is sandwiched therebetween.

Examples of a member constituting the observation port in Embodiment 1 include a front plate of a display (e.g. a self-luminous display element or non-self-luminous display element), a protecting plate, a lens, and a windowpane.

A member constituting the internal structure in Embodiment 1 is not particularly limited as long as human eyes can visually confirm display through the front plate. Examples thereof include, in the case that the display panel 20 is a liquid crystal display panel as shown in FIG. 1, combination of a liquid crystal cell 21 comprising a pair of substrates and a liquid crystal layer sandwiched between the substrates, and polarizers 22 disposed on the respective faces of the liquid crystal cell 21. Examples of other internal structures include printed matter, photographs, coated articles, lighting, and housings. Further, examples of the member disposed on the surface of the internal structure include, in addition to the polarizers, a retardation film, light reflection sheet, prism sheet, and polarized reflection sheet.

The front plate 10 comprises a substrate 11 as a main body. A light-interference film (first anti-reflection film) 12 which reduces reflected light owing to light interference is disposed on the outside surface of the substrate 11, and a moth-eye film (second anti-reflection film) 13 is disposed on the backside (display panel side) surface of the substrate 11. The moth-eye film has a surface formed by multiple protruding portions and the width between apexes of adjacent protruding portions is not greater than the visible light wavelength.

The light-interference film (first anti-reflection film) 12 reduces reflection at the interface between the outside air layer and the front plate 10, and the moth-eye film (second anti-reflection film) 13 reduces reflection at the interface between the air layer 30 in the structure with an observation port and the front plate 10. Further, in Embodiment 1, the outermost surface on the side of the front plate of the display panel 20 is also provided with a moth-eye film (third anti-reflection film) 23. This film reduces reflection at the interface between the air layer 30 and the display panel 20 in the structure with an observation port.

In Embodiment 1, the structure is designed in such a manner that light obtainable by combining the light reflected from the surface of the first anti-reflection film, the light reflected from the surface of the second anti-reflection film, and the light reflected from the surface of the third anti-reflection film has an even (flat) wavelength dispersion characteristic within the visible light range. Thereby, coloring due to reflected light in the display can be suppressed and the display quality of the display panel can be improved.

The material of the substrate 11 is not particularly limited as long as the anti-reflection films can be attached thereto. The substrate 11 may be semitransparent or opaque. In the case of an opaque substrate, the films provide an effect of preventing surface reflection for an opaque body. For example, in the case of a black substrate, good pitch-black appearance can be obtained and, in the case of a colored substrate, high color-purity appearance can be obtained. Thereby, well-designed articles can be obtained. The shape of the substrate 11 is not particularly limited. The substrate may be a film, sheet, injection-molded product, or melt-molded product such as a press-molded product, for example. Examples of the material of a semitransparent substrate 11 include glass, plastics such as TAC (triacetyl cellulose), polyethylene, an ethylene-propylene copolymerized product, PET (polyethylene terephthalate), acrylic resin, and methacrylic resin, and metals.

The light-interference film 12 is an anti-reflection film that suppresses reflection by making the phase of light reflected from the outside surface of the light-interference film and the phase of light reflected from the surface on the display panel side thereof reverse to each other, and making them interfere to counteract each other. Further, in the case that the light-interference film 12 has a multilayer structure, light reflected at the respective interfaces of the multilayer structure, that is, reflected in the light-interference film, may be used as a material for light interference, in addition to the light reflected from each surface.

Examples of the light-interference film include an LR film and AR film. These films generally have a flat surface unlike moth-eye films, and thus they have high surface durability.

The LR film is a film comprising a single layer or about two or three layers, and having a reflectance of about 1 to 3%. Since the layer structure of the LR film is simple, the LR film can be formed by a wet-coating process.

The AR film is generally formed by a dry formation method, has about four to seven multilayer structure, and has a reflectance of about 0.2%. Since the formation speed of the AR film is difficult to increase and the productivity is low, the AR film is not suitable for large-size uses. In contrast, the AR film has an excellent effect of preventing outdoor light reflection. Thus, it is suitably used for mobile devices which are used under bright daylight, for example, in the outdoors.

Figure 2:
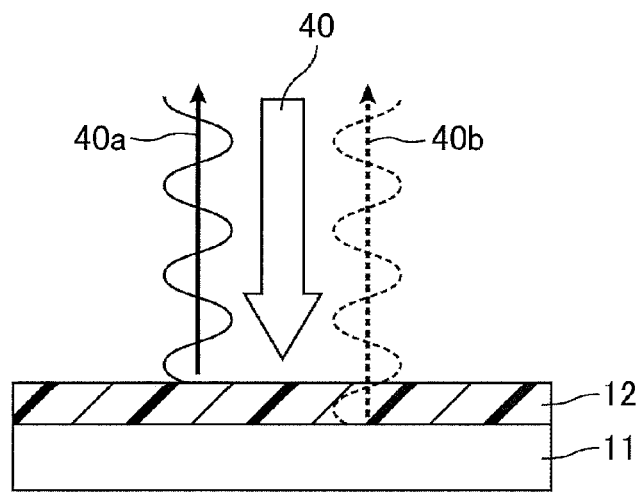
[FIG. 2]

FIG. 2 is a schematic view showing the principle that a light-interference film such as an LR film or AR film achieves low reflection. As shown in FIG. 2, the light-interference film 12 is used in a state of being disposed on the substrate 11. In this case, a light beam 40 incident on the light-interference film 12 is divided into a component 40a reflected from the outside surface of the light-interference film 12 and a component 40b reflected from the surface on the substrate side. The light-interference film 12 is designed such that the phase of the component 40a reflected from the outside surface and the phase of the component 40b reflected from the surface on the substrate side are different by a wavelength of exactly N−1/2 (N is an integer of 1 or greater). Thereby, the component 40a reflected from the outside surface and the component 40b reflected from the surface on the substrate side have reverse phases and counteract each other by interference. As a result, the reflectance is reduced.

In contrast, the moth-eye film allows the refractive index at the boundary between the outside surface of the substrate and the surface of the substrate to change pseudo-continuously, and allows most part of light to pass therethrough regardless of the refractive index interface. As a result, the reflectance is reduced.

Each of the moth-eye films used in Embodiment 1 comprises multiple protruding portions on the surface, and the width between the apexes of adjacent protruding portions is not greater than the visible light wavelength. In other words, the moth-eye films 13 and 23 of Embodiment 1 have a structure wherein multiple protruding portions exist and the distance (the width between adjacent protruding portions in an aperiodic structure) or pitch (the width between adjacent protruding portions in a periodic structure) between the apexes of adjacent protruding portions is not greater than the visible light wavelength. The protruding portions in Embodiment 1 each are more preferable in that they cause no needless diffracted light even in the case that they have no regularity in the arrangement (aperiodic arrangement). The moth-eye films 13 and 23 can be produced from the same material.

Figure 3:
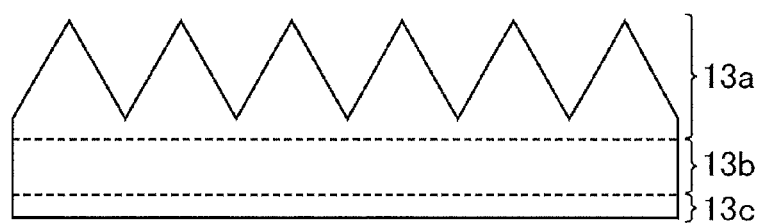
[FIG. 3]

FIG. 3 is an enlarged schematic cross-sectional view of the surface of the moth-eye film of the structure with an observation port of Embodiment 1. The moth-eye film may have a monolayer structure or may have a laminated structure. In the case of a laminated structure as shown in FIG. 3, an uneven portion 13a with multiple protruding portions formed on its surface and the supporting portion 13b which supports the uneven portion 13a may be formed from films of different materials. Further, the surface of the supporting portion 13b opposite to the surface on the side of the uneven portion 13a may have an adhesion portion 13c for bonding the moth-eye film to the substrate. In this case, however, the materials of the uneven portion 13a, the supporting portion 13b, and the adhesion portion 13c need to have substantially the same refractive indexes.

Examples of the material forming the uneven portion on the moth-eye film include resins which show curability under certain conditions and thus can be used in photo-nanoimprinting and thermo-nanoimprinting. Particularly preferable are photo-curable resins which can be used in photo-nanoimprinting wherein precision patterning is performed, such as acrylate resin and methacrylate resin.

Examples of the material forming the supporting portion 13b of the moth-eye film include resin materials such as triacetyl cellulose, polyethylene terephthalate, polyolefinic resin including cyclic olefinic polymers (typified by norbornene resin e.g. trade name "ZEONOR" (ZEON CORPORATION) and trade name "ARTON" (JSR Corporation)), polypropylene, polymethylpentene, polycarbonate resin, polyethylene naphthalate, polyurethane, polyetherketone, polysulfone, polyethersulfone, polyester, polystyrenic resin, and acrylic resin.

The material of the adhesion portion 13c of the moth-eye film is not particularly limited. The moth-eye film may have other layers such as an anchor-treated layer and a hardcoat layer between the supporting portion 13b and the adhesion portion 13c in order to improve close adhesiveness.

Figure 4:
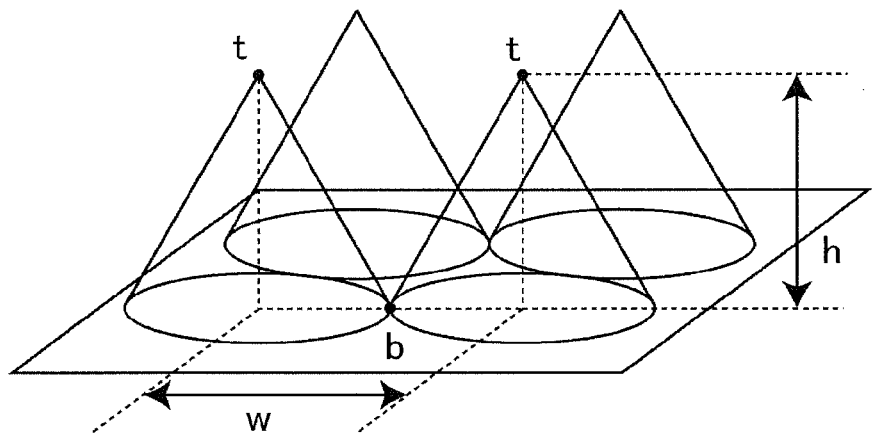
[FIG. 4]
Figure 5:
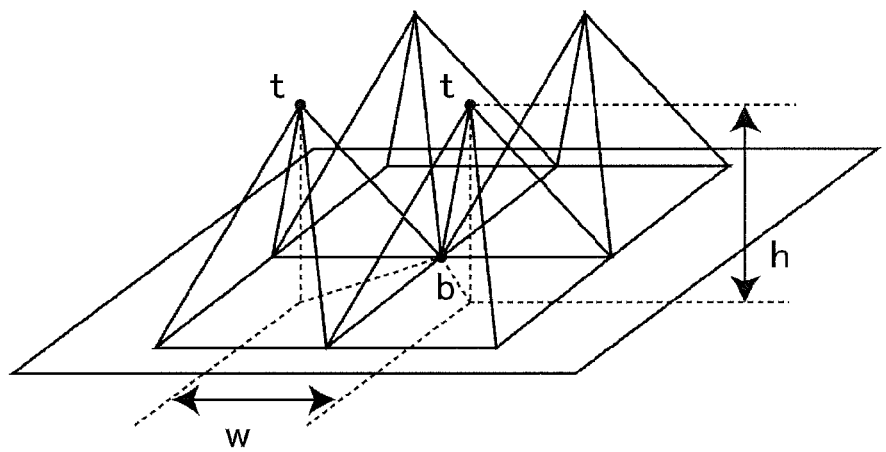
[FIG. 5]
Figure 6:
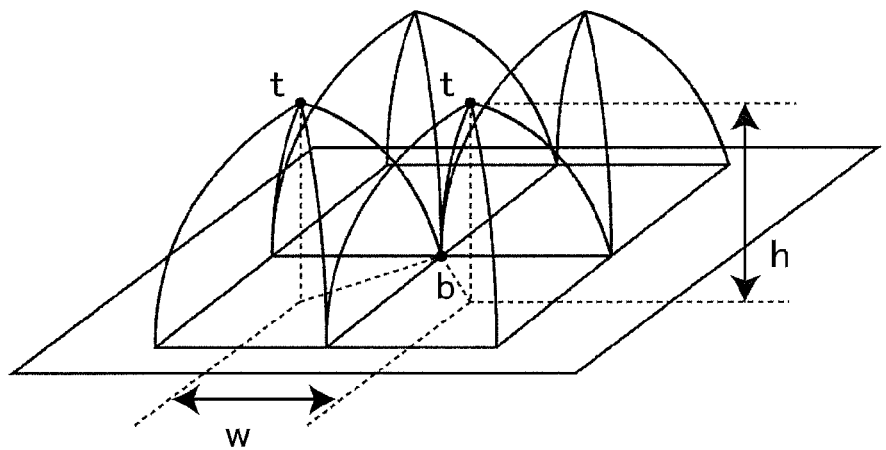
[FIG. 6]
Figure 7:
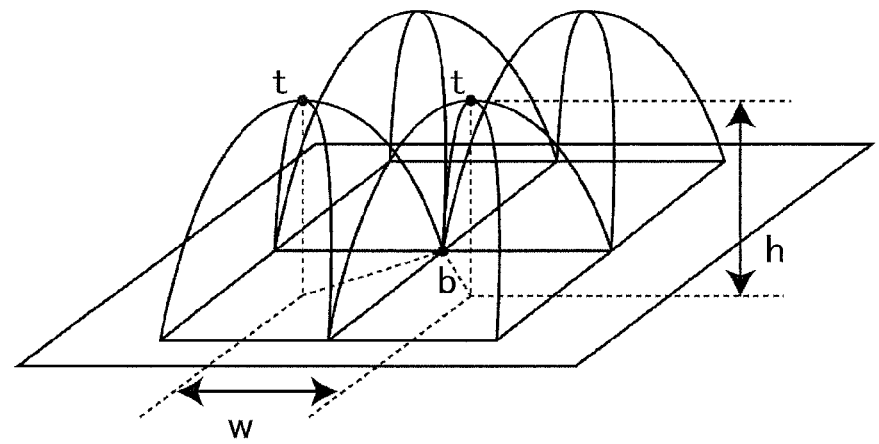
[FIG. 7]
Figure 8:
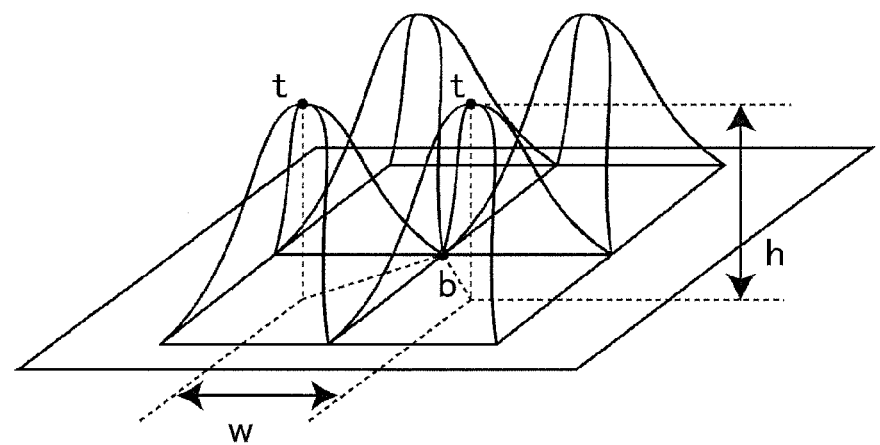
[FIG. 8]
Figure 9:
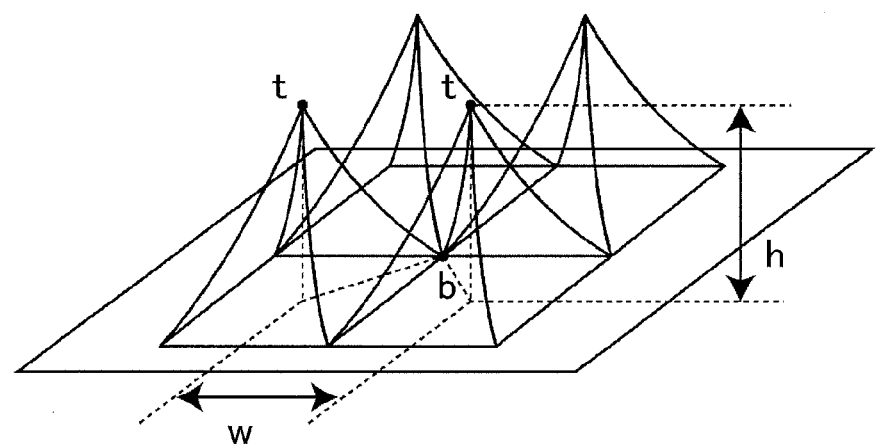
[FIG. 9]

The following will describe the shape of each protruding portion of the moth-eye films 13 and 23 in detail. FIGS. 4 to 9 each are an enlarged perspective view showing the surface of the moth-eye film of the structure with an observation port of Embodiment 1. FIG. 4 shows the case that the unit structure of each protruding portion is a conical shape; FIG. 5 shows the case that the unit structure of each protruding portion is a quadrangular pyramid shape; FIG. 6 shows the case that the slope of the unit structure of each protruding portion becomes mild from the bottom point to the apex (a dome shape) and the tip is pointed; FIG. 7 shows the case that the slope of the unit structure of each protruding portion becomes mild from the bottom point to the apex (a dome shape) and the tip is rounded; FIG. 8 shows the case that the slope of the unit structure of each protruding portion becomes steep from the bottom point to the apex (a needle shape) and the tip is rounded; and FIG. 9 shows the case that the slope of the unit structure of each protruding portion becomes steep from the bottom point to the apex (a needle shape) and the tip is pointed. As shown in FIGS. 4 to 9, the top portion of each protruding portion is an apex t and the point where protruding portions are in contact with each other is a bottom point b, in the moth-eye structure. As shown in FIGS. 4 to 9, the width w between the apexes of adjacent protruding portions of the moth-eye structure is represented by the distance between two points which are the feet of the perpendicular lines drawn from the apexes t of the protruding portions to the same plane. Further, the height h from the apex to the bottom point of the moth-eye structure is represented by the distance of the perpendicular line drawn from the apex t of the protruding portion to the plane where the bottom point b thereof exists. In other words, the aspect ratio of each protruding portion is represented by h/w provided that the height is divided by the pitch (the distance between the apexes).

In the moth-eye films 13 and 23, the width w of the apexes of adjacent protruding portions is 380 nm or smaller, preferably 300 nm or smaller, and more preferably 200 nm or smaller. Further, the height h is 100 to 600 nm, and preferably 200 to 400 nm. Although FIGS. 4 to 9 exemplify a conical shape, quadrangular pyramid shape, dome shape, and needle shape, as the unit-structure shape of the protruding portions, the unit structure of the moth-eye structure in Embodiment 1 is not particularly limited as long as apexes and bottom points are formed and the structure has irregularities with the width thereof controlled to not greater than the visible light wavelength. Alternatively, for example, the structure may have a stepwise shape wherein the slope of a shape has steps.

Figure 10:
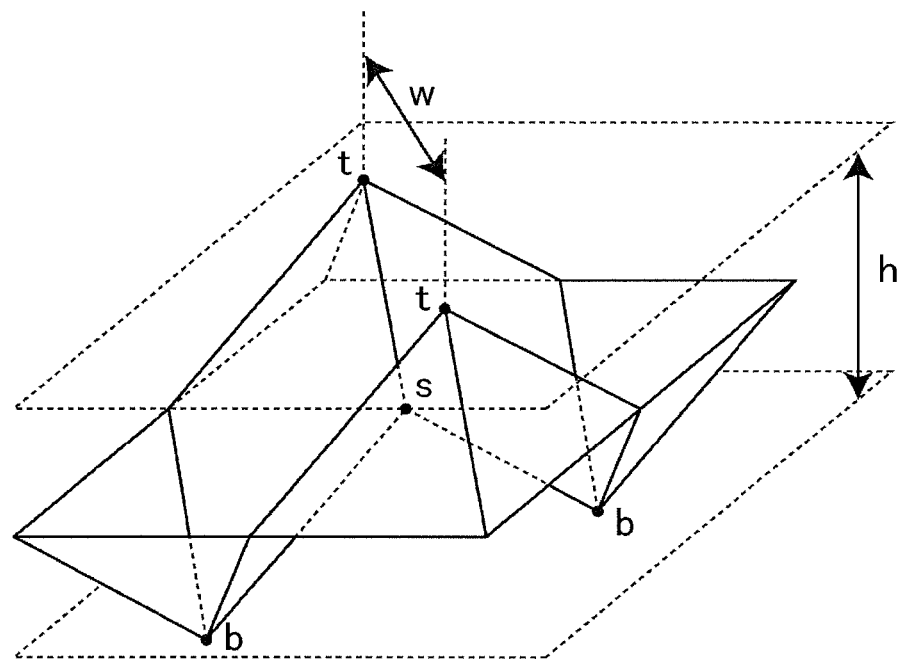
[FIG. 10]
Figure 11:
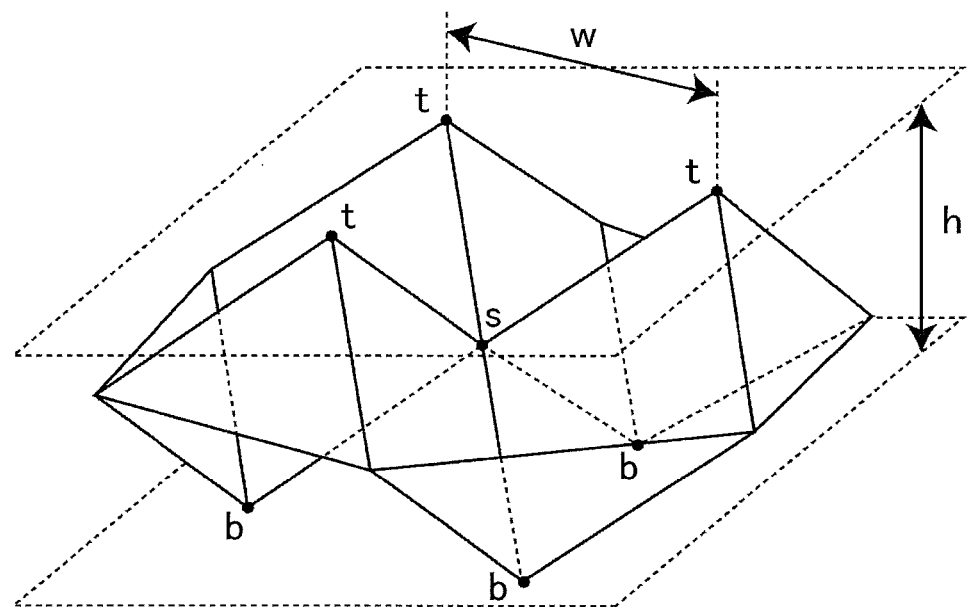
[FIG. 11]
Figure 12:
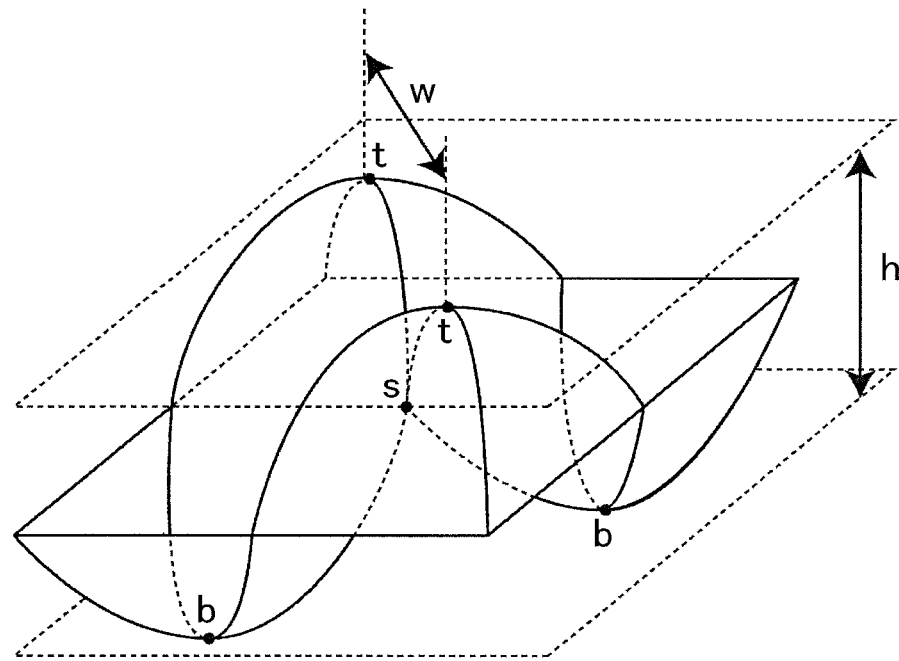
[FIG. 12]

In Embodiment 1, the protruding portions of the moth-eye film may have multiple arrangements, or may have no arrangement. In other words, the film is not limited to the structure in which the bottom points (the points where the protruding portions are in contact with each other) of adjacent protruding portions have the same heights. As shown in FIG. 10 to FIG. 12, for example, the film may have a structure in which the points (contact points) on the surface where the protruding portions are in contact with each other have multiple heights. In this case, the structure includes a col. The col means a recessed portion in a ridgeline of a mountain. Based on a protruding portion having one apex t, there are multiple contact points each at a position lower than the apex t, and they form a col. In the present description, the lowest contact point around a protruding portion is named a bottom point b, and a point at a position lower than the apex t and higher than the bottom point b which serves as an equilibrium point of the col is named a col point s. In this case, the distance w between the apexes of protruding portions corresponds to the width between adjacent apexes, and the distance h from the apex to the bottom point in the vertical direction corresponds to the height of a protruding portion.

Figure 13:
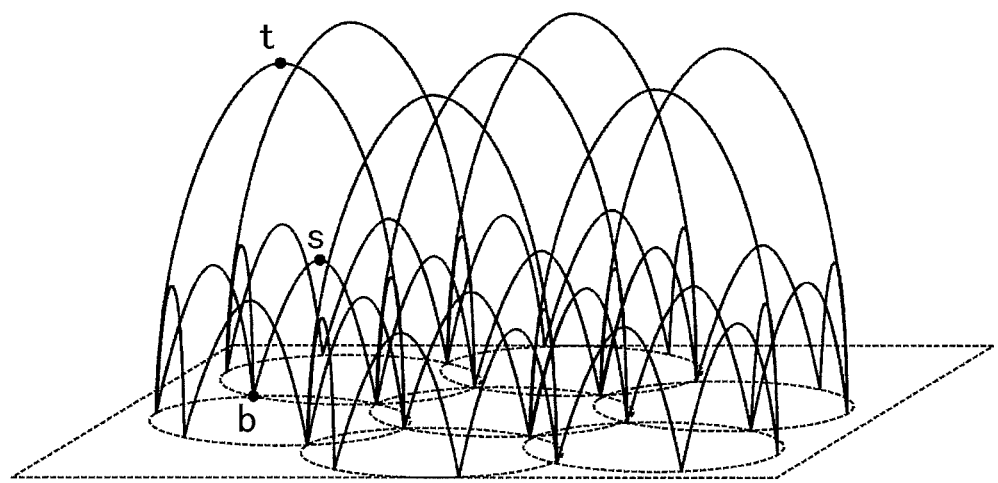
[FIG. 13]
Figure 14:
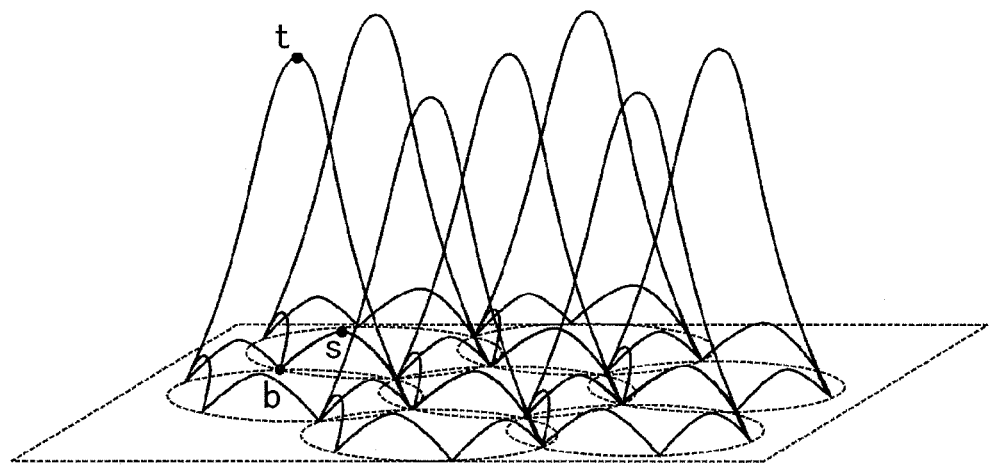
[FIG. 14]

The above structure will be more specifically described below. The following will show one example of the case wherein a protruding portion having one apex has multiple contact points with adjacent protruding portions and a col (col point) is formed at a position lower than the apex t. FIG. 13 and FIG. 14 each are a schematic perspective view specifically showing the protruding portions of the moth-eye film. FIG. 13 is an enlarged view showing the case of a dome shape with cols and col points, whereas FIG. 14 is an enlarged view showing the case of a needle shape with cols and col points. As shown in FIG. 13 and FIG. 14, with respect to one apex t of the protruding portion, there are multiple contact points of adjacent protruding portions each at a position lower than the apex t. As is shown by the comparison between FIG. 13 and FIG. 14, the height of each col point s is likely to be lower in the needle shape than in the dome shape.

Figure 15:
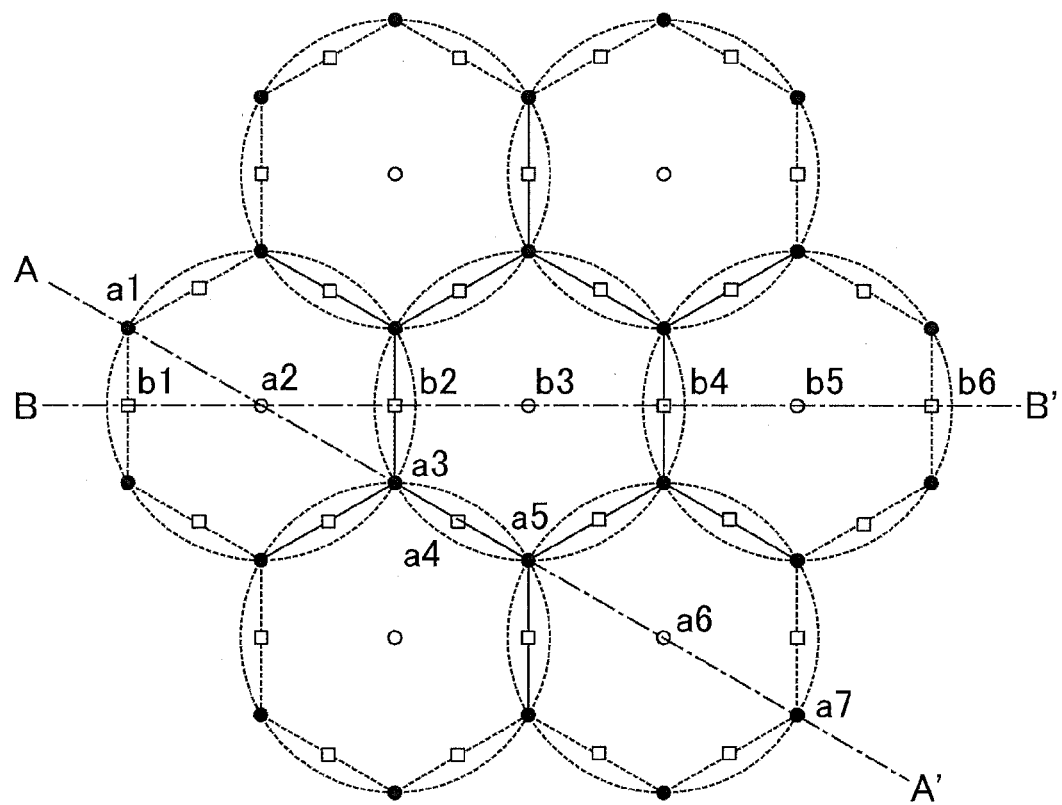
[FIG. 15]

FIG. 15 is a schematic plan view showing protruding portions of the moth-eye film of the structure with an observation port of Embodiment 1. In FIG. 15, white circles represent the apexes, black circles represent the bottom points, and white squares represent the col points of the cols. As shown in FIG. 15, bottom points and col points are formed on a concentric circle with one apex as the center. FIG. 15 schematically shows the case wherein six bottom points and six col points are formed on one circle. The structure is not limited to this case, and more irregular structures may be included. White circles represent the apexes, white squares represent the col points, and black circles represent the bottom points.

Figure 16:
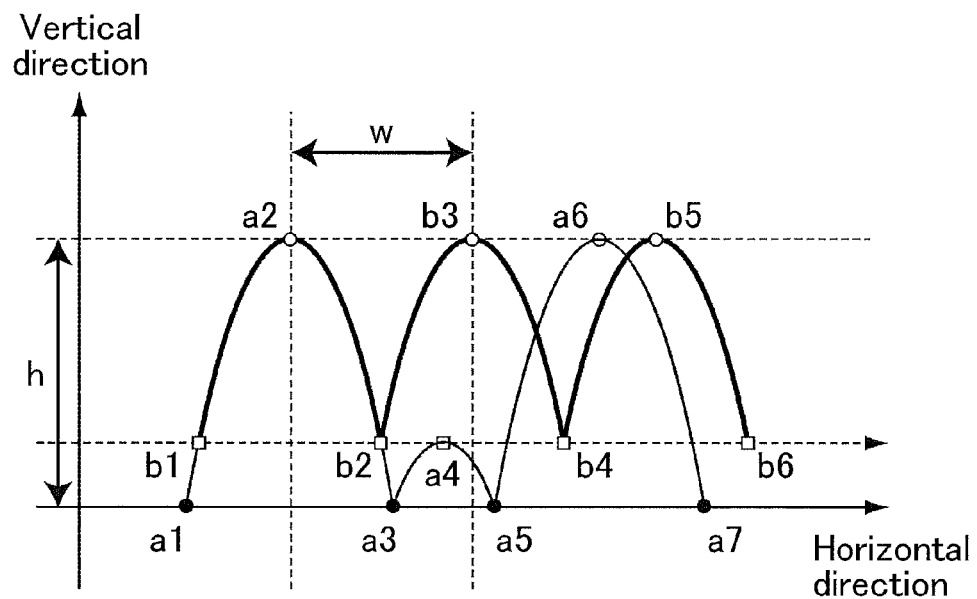
[FIG. 16]

FIG. 16 is a schematic view showing the cross section along the A-A' line in FIG. 15 and the cross section along the B-B' line in FIG. 15. Apexes are represented by a2, b3, a6, and b5, cols are represented by b1, b2, a4, b4, and b6, and bottom points are represented by a1, a3, a5, and a7. In this case, the relationship between the points a2 and b3 and the relationship between the points b3 and b5 corresponds to the relationship between adjacent apexes, and the distance between the points a2 and b3 and the distance between the points b3 and b5 correspond to the width w between adjacent apexes. Further, the distance between the point a2 and the point a1 or a3 and the distance between the point a6 and the point a5 or a7 correspond to the height h of the protruding portion.

FIG. 1 and FIG. 3 to FIG. 14 show the case that multiple protruding portions are arranged so as to have a repeating unit with a period of not greater than the visible light wavelength as a whole. The protruding portions may have a portion without periodicity, or may have no periodicity as a whole. Further, the width between one protruding portion among the multiple protruding portions and one of adjacent protruding portions may be different from that between the one protruding portion and another of the adjacent protruding portions. An aperiodic structure leads to an advantage in performance that transmission due to regular arrangement and diffraction scattering of reflection are less likely to occur, and an advantage in production that the pattern is easily produced. Further, as shown in FIGS. 10 to 16, with respect to one protruding portion in the moth-eye film, multiple contact points each at a position lower than the apex and each having a different height may be formed around the apex. The surface of the moth-eye film may have irregularities of a greater order than the nano order, for example micro-order or larger irregularities. In other words, the surface of the moth-eye film may have a duplex uneven structure.

Figure 17:
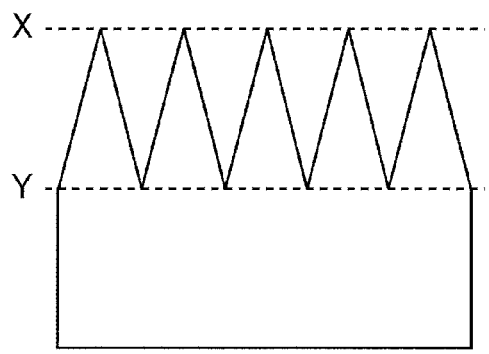
[FIG. 17]
Figure 18:
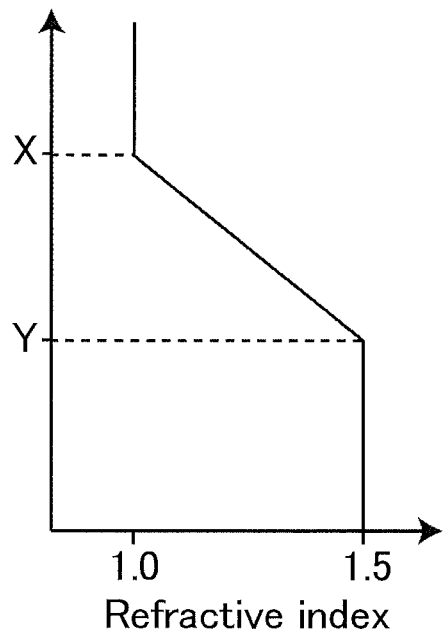
[FIG. 18]

The following will describe the principle that the moth-eye film achieves low reflection. FIG. 17 and FIG. 18 each are a schematic view showing the principle that the moth-eye film achieves low reflection. FIG. 17 shows the cross-sectional structure of the moth-eye film and FIG. 18 shows the refractive index (effective refractive index) of the light incident on the moth-eye film. When travelling from one medium to another medium, light is refracted, transmitted, and reflected at the interface between these media. The degrees of refraction and the like depend on the refractive index of the medium through which light passes. For example, the air has a refractive index of about 1.0 and a resin has that of about 1.5. In Embodiment 1, the unit structure of the uneven structure formed on the surface of the moth-eye film has a substantially conical shape, in other words, a shape gradually tapered toward the tip direction. Thus, as shown in FIG. 18, the refractive index can be considered to gradually and continuously increase from about 1.0, which is the refractive index of the air, to the refractive index of the film constituent material (about 1.5 in the case of resin) in the protruding portion (between X to Y) at the interface between the air layer and the moth-eye film. The amount of reflected light depends on the refractive index difference between the media. Thus, most part of the light is allowed to pass through the moth-eye film by artificially ensuring that the refractive interface of light does not substantially exist, leading to a great reduction in the reflectance on the film surface.

In Embodiment 1, the display panel may have a fourth or subsequent anti-reflection film (nth anti-reflection film). In such a case, the light in total reflected from the surfaces of all the anti-reflection films, that is, the first anti-reflection film, the second anti-reflection film, the third anti-reflection film, and the fourth and subsequent anti-reflection films, preferably has even (flat) wavelength dispersion within the visible light range. The fourth and subsequent anti-reflection films are included as internal structures of the display panel, and do not need surface durability. Thus, they are preferably moth-eye films. Thereby, excellent light transmissivity and an effect of preventing coloring of reflected light can be achieved.

Evaluation Test 1

A structure with an observation port of Example 1 was produced as one specific example of Embodiment 1 and structures with an observation port of Comparative Example 1 and Comparative Example 2 were produced as comparative examples of Example 1, and the results of measuring the reflectances thereof are shown below.

Figure 19:
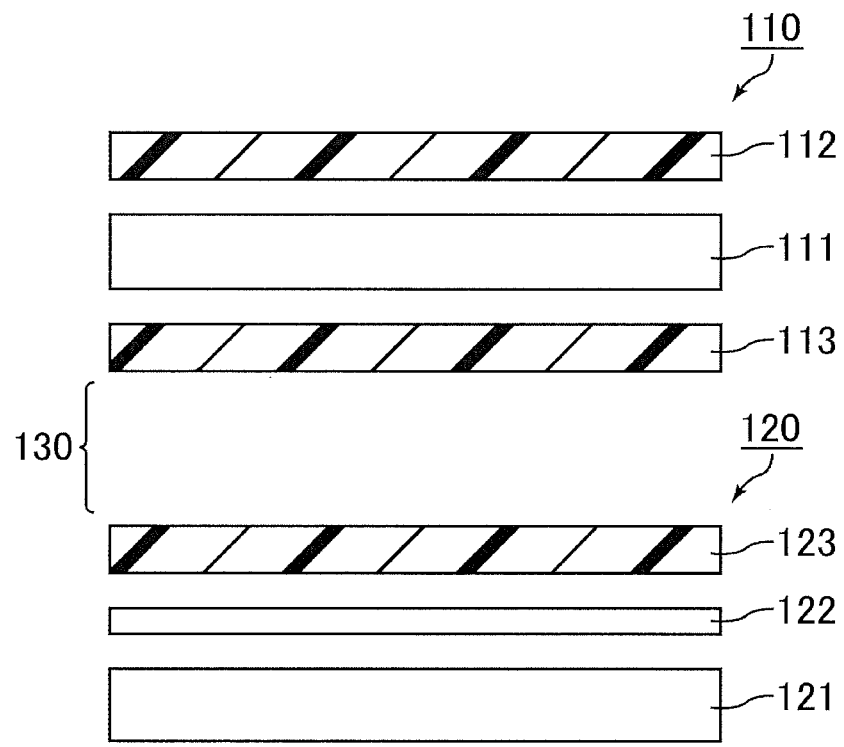
[FIG. 19]
Figure 20:
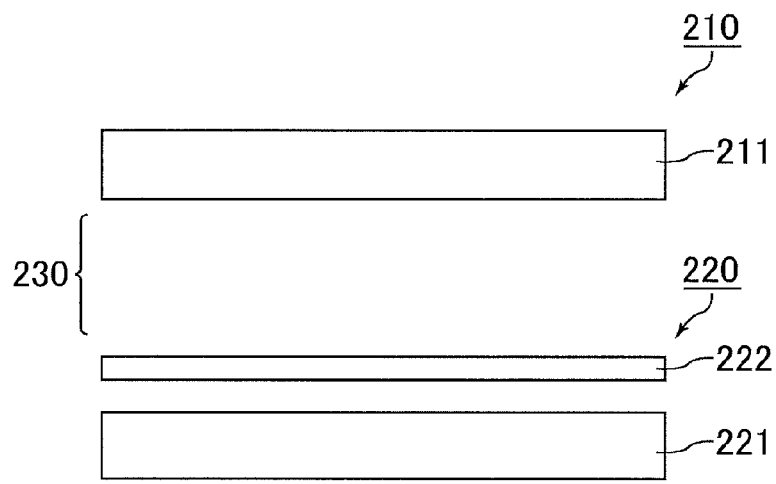
[FIG. 20]

FIG. 19 is a schematic cross-sectional view of the structure with an observation port of Comparative Example 1, and FIG. 20 is a schematic cross-sectional view of the structure with an observation port of Comparative Example 2. The structure with an observation port of Example 1 has the same structure as shown in FIG. 1, and thus the description thereof is omitted here.

As shown in FIG. 19, the structure with an observation port of Comparative Example 1 comprises a display panel (internal structure) 120 and a front plate (observation port) 110 disposed on the outside of the display panel 120. The front plate 110 and the display panel 120 are separated by a certain distance with an air layer 130 sandwiched therebetween. Similarly to Example 1, the display panel 120 is a combination of a liquid crystal cell 121 and polarizers 122 attached on the respective surfaces of the liquid crystal cell 121. The front plate 110 comprises a substrate 111 as a main body, and comprises light-interference films 112 and 113 which reduce reflected light owing to light interference on the respective surfaces of the substrate 111. Further, the outermost surface of the display panel 120 on the side of the front plate is also provided with a light-interference film 123. In other words, the structure with an observation port of Comparative Example 1 has no moth-eye film.

As shown in FIG. 20, the structure with an observation port of Comparative Example 2 comprises a display panel (internal structure) 220 and a front plate (observation port) 210 disposed on the outside of the display panel 220, and the front plate 210 and the display panel 220 are separated by a certain distance with an air layer 230 sandwiched therebetween. Similarly to Example 1, the display panel 220 is a combination of a liquid crystal cell 221 and polarizers 222 attached on the respective surfaces of the liquid crystal cell 221. The front plate 210 is formed from a substrate 211. In other words, the structure with an observation port of Comparative Example 2 has no anti-reflection film, neither a light-interference film nor a moth-eye film.

The respective anti-reflection films disposed on the structures with an observation port of Example 1 and Comparative Example 1 were produced as follows.

The method of producing an LR film will be described. Examples of typical coating techniques for an LR film include a kiss reverse technique, wire bar technique, and slit die technique. The kiss reverse technique among these is a technique in which a coating solution is transferred from a coating solution filling container to grooves formed on a printing plate, and the coating solution stored in the grooves is transferred onto a substrate. The wire bar technique is a technique in which a wire is wrapped around a shaft and, using its shape, a coating solution stored between wire lines is transferred so that a constant amount of the coating solution is applied to a substrate. The slit die technique is a technique of applying a constant amount of a coating solution to a substrate through a die with slits. In the slit die technique, the coating solution stored in the die is pressure-fed by a pump at a constant pressure and is not in contact with the air. Thus, the coating solution does not deteriorate and a stable film thickness can be achieved.

The LR film was produced by the slit die technique here.

The method of producing an AR film will be described. Preferable examples of a method of forming an AR film include a vapor deposition method and a sputtering method. The vapor deposition method is a method in which a film material is heated, dissolved, and evaporated in a vacuum, and thereby applied to a target article. The sputtering method is a method in which several hundred volts of a voltage is applied between a vacuum container charged with an inert gas and an electrode (target) formed from a film material. At this time, the inert gas particles are positively charged owing to the discharge energy, and the positively charged particles are attracted to the negative electrode by strong force and collide with the electrode. As a result, part of the film material becomes particles and spattered, and thereby a film is formed on the substrate. Examples of a typical sputtering method include a DC magnetron sputtering method.

The AR film was produced by the vapor deposition method.

The method of producing a moth-eye film will be described. First, a 10-cm square glass substrate was prepared, and aluminum (Al), which is a material of a mold, was deposited on the glass substrate at a thickness of 1.0 μm by sputtering. Next, the aluminum was anodized, and then immediately etched. These steps were repeated, and thereby an anodized layer was formed. Here, the anodized layer has a large number of fine depressed portions, and the distance between the bottom points of adjacent depressed portions is not greater than the visible light wavelength. Specifically, anodization, etching, anodization, etching, anodization, etching, anodization, etching, and anodization were performed in this order, and this flow (anodization: 5 times, etching: 4 times) provided a mold. Owing to such repeated steps of anodization and etching, each of the fine depressed portions to be formed can have a tapered shape toward the inside of the mold. The substrate of the mold is not limited to glass, and examples thereof include metal materials such as SUS and Ni, and resin materials such as polypropylene, polymethylpentene, polyolefinic resin including cyclic olefinic polymers (typified by norbornene resin e.g. trade name "ZEONOR" (ZEON CORPORATION) and trade name "ARTON" (JSR Corporation)), polycarbonate resin, polyethylene terephthalate, polyethylene naphthalate, and triacetyl cellulose. Further, an aluminum bulk substrate may be used instead of an aluminum-coated substrate. The shape of the mold may be a plate shape or may be a roll (cylinder) shape.

The anodization was performed under the following conditions: 0.6 wt % oxalic acid; liquid temperature of 5° C.; and applied voltage of 80 V. The anodization time was 25 seconds. Adjustment of the anodization time causes difference in the size of each depressed portion to be formed. The etching was performed under the following conditions: 1 mol/l phosphoric acid, liquid temperature of 30° C.; and 25 minutes.

A translucent 2P (photo-polymerizable) resin solution was dropped on the surface of each mold produced through the above production step and having depressed portions whose depth is different from that of the depressed portions of other molds. Then, a TAC film was carefully attached to a 2P resin layer produced from the 2P resin solution using a roller so as not to contain air bubbles. Next, the 2P resin layer was irradiated with ultraviolet (UV) light at 2 J/cm$^2$, so that the 2P resin layer was cured. Thereafter, a laminated film of the cured 2P resin film and the TAC film was peeled off.

Specific examples of a method of forming (duplicating) fine irregularities on a substrate using a mold include, in addition to the 2P method (photo-polymerization method), duplicating methods such as a heat pressing method (embossing method), injection molding method, and sol-gel method, a method of laminating a shaped sheet with fine irregularities, and a method of printing a layer with fine irregularities, and the method may be appropriately selected therefrom depending on the uses of anti-reflection articles and the materials of the substrates.

Further, the depth of the mold, the height of the printed article, the pitch of the depressed portions of the mold, and the pitch of the protruding portions of the printed article were measured using a SEM (scanning electron microscope). As a result, the depth of the mold was 387 nm, the height of the printed matter was 219 nm, and the pitch of the recessed portions of the mold and the pitch of the protruding portions of the printed matter were 180 nm. Each protruding portion had a conical shape and an aspect ratio of 1.22. The depth of the mold can be adjusted depending on the length of the anodization time.

The present inventors have performed the studies on the wavelength dispersion characteristic of the moth-eye film and clarified that in the case that the pitches were standardized to about 180 nm, for example, the reflectance of wavelength components on the longer wavelength side increases as the aspect ratio of each protruding portion of the moth-eye film decreases, whereas the reflectance of wavelength components on the shorter wavelength side increases as the aspect ratio of each protruding portion of the moth-eye film increases.

Figure 21:
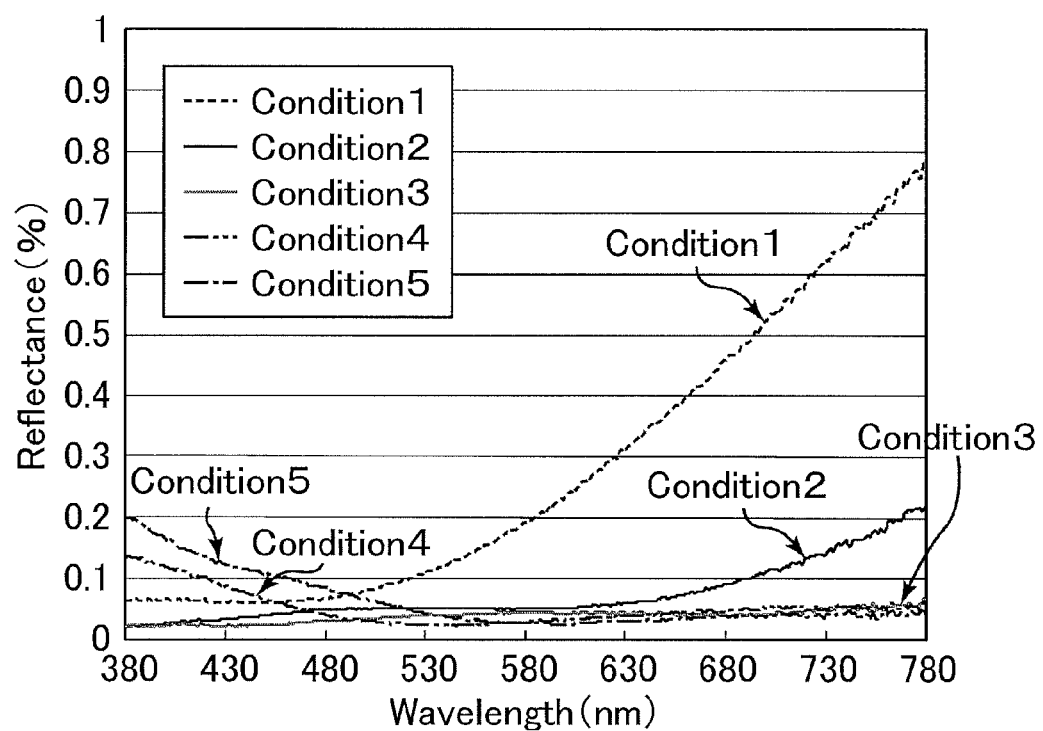
[FIG. 21]

FIG. 21 is a graph showing the reflection spectra of light reflected from one face of a tabular member formed by disposing a moth-eye film on one face of a black acryl plate (substrate), wherein the height of each protruding portion in one condition is different from that in another condition. In FIG. 21, Condition 1 shows the case where the aspect ratio of each protruding portion is 0.79, Condition 2 shows the case where the aspect ratio of each protruding portion is 0.97, Condition 3 shows the case where the aspect ratio of each protruding portion is 1.22, Condition 4 shows the case where the aspect ratio of each protruding portion is 1.42, and Condition 5 shows the case where the aspect ratio of each protruding portion is 2.07.

The wavelength dispersion characteristic of the moth-eye film can be adjusted by adjusting the height and the aspect ratio of each protruding portion and the pitch of the protruding portions of the moth-eye film. Thus, appropriate combination of the moth-eye films based on this fact provides flat (even) wavelength dispersion of total light due to the configuration of the structure with an observation port.

Figure 22:
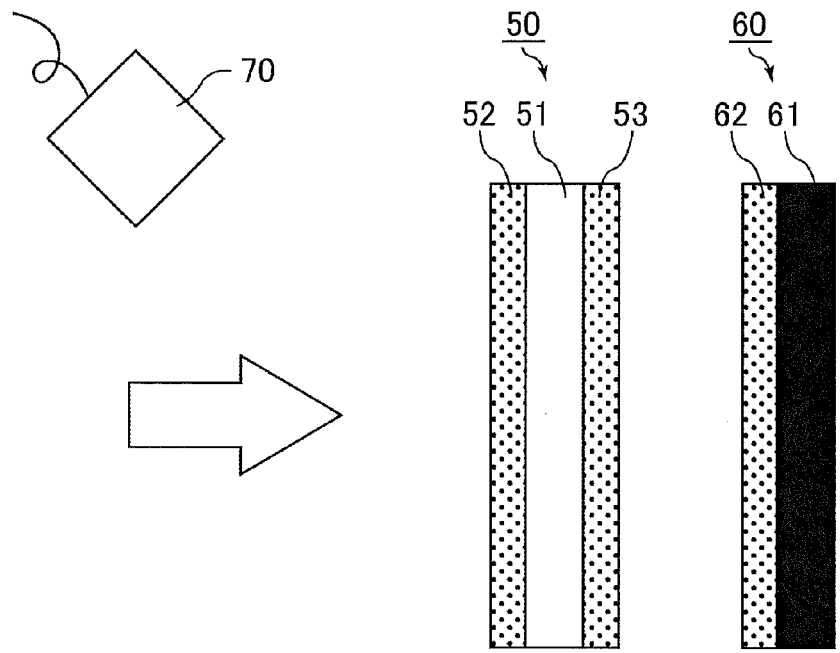
[FIG. 22]

FIG. 22 is a schematic view showing the state of measurement of light reflected due to the configuration of the structures with an observation port of Example 1 and Comparative Example 1. In order to measure the reflectance corresponding to the light reflected from both faces of the front plate, a tabular member 50 with anti-reflection films 52 and 53 attached to the respective faces of a transparent acryl plate 51 was prepared. Further, in order to measure the reflectance corresponding to the light reflected from the surface of the display panel, a tabular member 60 with an anti-reflection film 62 bonded to one face of a black acryl plate 61 using a roller was prepared. The tabular members 50 and 60 were stacked, and the reflectance of the light reflected due to these members was measured using a UV-Vis spectrophotometer V-560 (JASCO Corporation). In the measurement, the reflection spectrum of 5° regular reflection light was measured with a halogen lamp as a light source and a detector 70. In Example 1, an LR film was used as the anti-reflection film 52, a moth-eye film was used as the anti-reflection film 53, and a moth-eye film was used as the anti-reflection film 62. In Comparative Example 1, the anti-reflection films 52, 53, and 62 each were an LR film.

Figure 23:
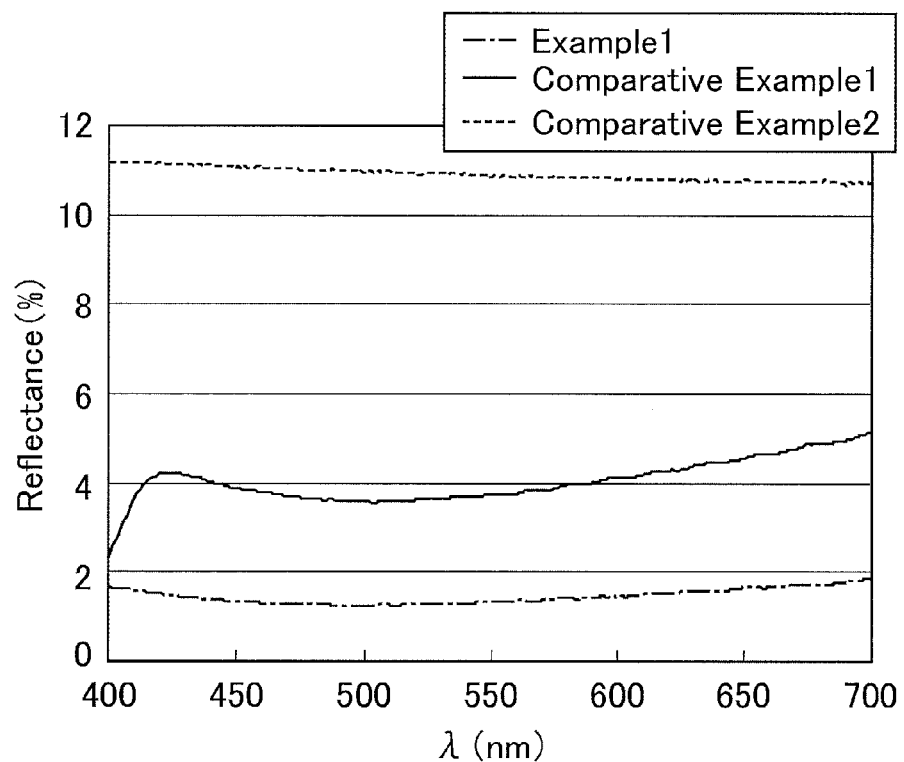
[FIG. 23]
Figure 24:
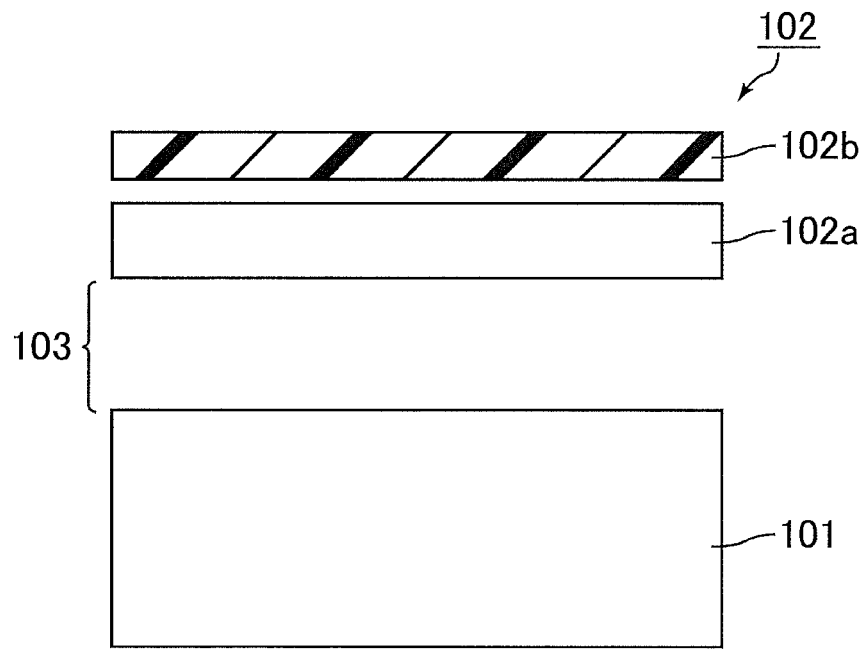
[FIG. 24]
Figure 25:
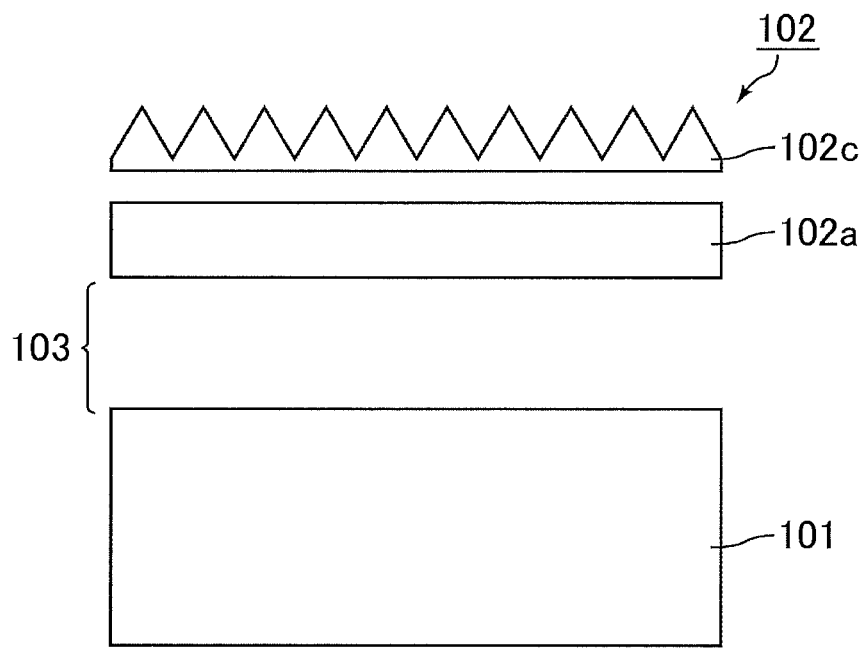
[FIG. 25]
Figure 26:
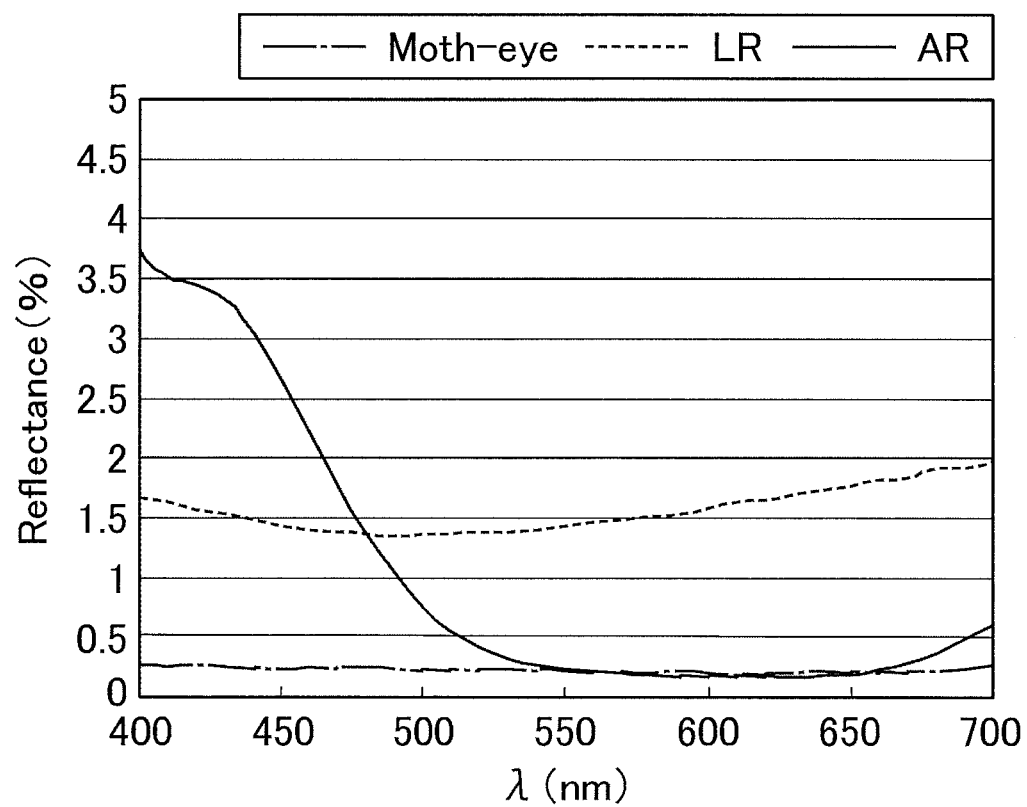
[FIG. 26]

FIG. 23 is a graph showing the reflection spectra of the light in total in Example 1, Comparative Example 1, and Comparative Example 2, wherein each spectrum is of the light in total reflected due to the configuration of the structure with an observation port. The wavelength dispersion characteristic of each structure with an observation port is obtainable by combining the wavelength dispersion characteristic in the aforementioned case of attaching anti-reflection films to the respective faces and the wavelength dispersion characteristic in the aforementioned case of attaching an anti-reflection film on one face.

As shown in FIG. 23, the reflectance of light in total occurring due to the configuration of the structure with an observation port of Comparative Example 1 drastically increases around 380 nm, the lower limit of the visible light wavelength range, and gradually increases toward 780 nm, the upper limit of the visible light wavelength range. In other words, a change rate of 1.0% or greater was observed around the reflectance of the 550 nm wavelength component. The reflectance of the 380 nm wavelength component was 2.0% while the reflectance of the 780 nm wavelength component was 6.0%.

As shown in FIG. 23, the reflectance of light in total occurring due to the configuration of the structure with an observation port of Comparative Example 2 does not greatly change from 380 nm, the lower limit of the visible light wavelength range, to 780 nm, the upper limit of the visible light wavelength range, and the reflectance is high as a whole. The reflectance of the 380 nm wavelength component was 11.1% while the reflectance of the 780 nm wavelength component was 10.6%. The reflectance of the 550 nm wavelength component was 10.8%.

As shown in FIG. 23, the reflectance of light in total occurring due to the configuration of the structure with an observation port of Example 1 does not greatly change from 380 nm, the lower limit of the visible light wavelength range, to 780 nm, the upper limit of the visible light wavelength range, and the reflectance is low as a whole. The reflectance of the 380 nm wavelength component was 1.9% while the reflectance of the 780 nm wavelength component was 2.0%. The reflectance of the 550 nm wavelength component was 1.3%.

In addition, the object colors of the respective samples, that is, the structures with an observation port of Example 1, Comparative Example 1, and Comparative Example 2, were defined using standard illuminant $D_{65}$ as a light source and based on the transmissivity characteristics of the standard illuminant $D_{65}$ with respect to the weighting coefficients of the XYZ color system. Then, the Y value, x and y values, and a* and b* values of the reflected light were measured using a spectrophotometer CM-2600d (Konica Minolta Sensing, Inc.). Further, the color tone of each structure with an observation port was visually observed. In the production of the structures with an observation port, the conditions were adjusted based on the standard illuminant $D_{65}$ as a reference. Table 1 shows the measurement results.

TABLE 1

|  | Example 1 | Comparative Example 1 | Comparative Example 2 |
| --- | --- | --- | --- |
| Y value | 1.3706 | 3.8434 | 10.886 |
| x | 0.3254 | 0.3233 | 0.3107 |
| y | 0.3253 | 0.3234 | 0.3272 |
| a* | 2.056 | 2.855 | −0.066 |
| b* | 0.226 | −0.075 | −0.518 |
| Color tone (visual observation) | Achromatic | Light red | Achromatic |
| Comprehensive evaluation | + | − | − |

In Table 1, the symbol "+" shows that good display was achieved, whereas the symbol "−" shows that good display was not achieved.

As is shown in Table 1, coloring was observed in Comparative Example 1 wherein any reflectance value within the visible light range is beyond the range of ±1.0% from the reflectance of the 550 nm wavelength, whereas achromatic color was observed in Example 1 and Comparative Example 2 wherein the values were within the range of ±1.0%. In Comparative Example 2, however, an extremely higher reflectance was achieved than in Example 1, and its display was not good.

The present application claims priority to Patent Application No. 2009-213299 filed in Japan on Sep. 15, 2009 under the Paris Convention and provisions of national law in a designated State, the entire contents of which are hereby incorporated by reference.

EXPLANATION OF REFERENCE NUMERALS 10, 102, 110, 210: front plate
11, 102a, 111: substrate
12: light-interference film (first anti-reflection film)
13: moth-eye film (second anti-reflection film)
13a: uneven portion
13b: supporting portion
13c: adhesion portion
20, 120, 220: display panel (internal structure)
21, 121, 221: liquid crystal cell
22, 122, 222: polarizer
23: moth-eye film (third anti-reflection film)
30, 103, 130, 230: air layer
40: light
40a: component reflected from outside surface
40b: component reflected from surface on substrate side
50: tabular member
51: substrate (transparent acryl plate)
52, 53, 62: anti-reflection film
60: tabular member
61: substrate (black acryl plate)
70: detector
101: display panel
102b, 112, 113, 123: light-interference film
102c: moth-eye film

The invention claimed is:

1. A structure with an observation port, comprising:
an observation port comprising a substrate, a first anti-reflection film disposed on an outside surface of the substrate, and a second anti-reflection film disposed on a backside surface of the substrate; and
an internal structure placed on a backside of the observation port and comprising a third anti-reflection film,
the first anti-reflection film being a film that reduces reflected light owing to light interference,
the second anti-reflection film and the third anti-reflection film each having a surface formed by multiple protruding portions, a width between apexes of adjacent protruding portions being not greater than a visible light wavelength,
light reflected from a surface of the first anti-reflection film, light reflected from a surface of the second anti-reflection film, and light reflected from a surface of the third anti-reflection film, each having wavelength dispersion including an arbitrary reflectance value outside the range of ±1.0% from the reflectance at a wavelength of 550 nm within the visible light range, and
light obtainable by combining light reflected from the surface of the first anti-reflection film, light reflected from the surface of the second anti-reflection film, and light reflected from the surface of the third anti-reflection film having wavelength dispersion in which any reflectance value within the visible light range is within the range including ±1.0% from the reflectance at a wavelength of 550 nm.

2. The structure with an observation port according to claim 1, wherein the internal structure further comprises n−3 nth anti-reflection films, wherein n represents an integer of 4 or greater,
each of the n−3 nth anti-reflection films has a surface formed by multiple protruding portions, with a width between apexes of adjacent protruding portions being not greater than the visible light wavelength,
each of light reflected from the surface of the n−3 nth anti-reflection films has wavelength dispersion including an arbitrary reflectance value outside the range of ±1.0% from the reflectance at a wavelength of 550 nm within the visible light range, and
light obtainable by combining light reflected from the surface of the first anti-reflection film, light reflected from the surface of the second anti-reflection film, light reflected from the surface of the third anti-reflection film, and light reflected from the respective surfaces of the n−3 nth anti-reflection films has wavelength dispersion in which any reflectance value within the visible light range is within the range of ±1.0% from the reflectance at a wavelength of 550 nm.

3. The structure with an observation port according to claim 1, wherein an aspect ratio of each protruding portion of the second anti-reflection film is 0.8 or smaller.

4. The structure with an observation port according to claim 1,
wherein an air layer is formed between the observation port and the internal structure.

5. The structure with an observation port according to claim 1,
wherein the third anti-reflection film is disposed on an outermost surface of the internal structure on the side of the observation port.

6. The structure with an observation port according to claim 1,
wherein the internal structure further comprises n−3 nth anti-reflection films, wherein n represents an integer of 4 or greater,
each of the n−3 nth anti-reflection films has a surface formed by multiple protruding portions, with a width between apexes of adjacent protruding portions being not greater than the visible light wavelength, and
light obtainable by combining light reflected from the surface of the first anti-reflection film, light reflected from the surface of the second anti-reflection film, light reflected from the surface of the third anti-reflection film, and light reflected from the respective surfaces of the n−3 nth anti-reflection films has flat wavelength dispersion within the visible light range.

7. The structure with an observation port according to claim 1, wherein an aspect ratio of each protruding portion of the third anti-reflection film is 0.8 or smaller.

* * * * *